(12) United States Patent
Gupta et al.

(10) Patent No.: US 9,069,115 B2
(45) Date of Patent: Jun. 30, 2015

(54) EDGE CONFIGURATIONS FOR REDUCING ARTIFACTS IN EYEPIECES

(71) Applicant: Google Inc., Mountain View, CA (US)

(72) Inventors: Anurag Gupta, Los Gatos, CA (US); Steven Vincent James, San Jose, CA (US); Amber Marie Luttmann, Fremont, CA (US)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 13/870,813

(22) Filed: Apr. 25, 2013

(65) Prior Publication Data

US 2014/0320971 A1 Oct. 30, 2014

(51) Int. Cl.
*G02B 5/02* (2006.01)
*G02B 5/22* (2006.01)
*G02B 27/01* (2006.01)

(52) U.S. Cl.
CPC .. *G02B 5/02* (2013.01); *G02B 5/22* (2013.01); *G02B 2027/0121* (2013.01); *G02B 27/0172* (2013.01)

(58) Field of Classification Search
CPC .................................................... G02B 27/017
USPC .......................................................... 359/630
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,093,567 A | 3/1992 | Staveley | |
| 5,539,422 A | 7/1996 | Heacock et al. | |
| 5,696,521 A | 12/1997 | Robinson et al. | |
| 5,715,337 A | 2/1998 | Spitzer et al. | |
| 5,771,124 A | 6/1998 | Kintz et al. | |
| 5,815,126 A | 9/1998 | Fan et al. | |
| 5,844,530 A | 12/1998 | Tosaki | |
| 5,847,878 A | 12/1998 | Togino | |
| 5,861,995 A | 1/1999 | Togino | |
| 5,886,822 A | 3/1999 | Spitzer | |
| 5,896,232 A | 4/1999 | Budd et al. | |
| 5,943,171 A | 8/1999 | Budd et al. | |
| 5,949,583 A | 9/1999 | Rallison et al. | |

(Continued)

FOREIGN PATENT DOCUMENTS

GB 2 272 980 A 6/1994
JP 11-023806 1/1999

(Continued)

OTHER PUBLICATIONS

PCT/US2014/031630; PCT International Search Report and Written Opinion mailed Jul. 14, 2014, 13 pages.

(Continued)

*Primary Examiner* — Joseph P Martinez
(74) *Attorney, Agent, or Firm* — Blakely Sokoloff Taylor & Zafman LLP

(57) ABSTRACT

An eyepiece for a head mounted display ("HMD") includes a first end for receiving computer generated image ("CGI") light and a second end disposed opposite the first end. The eyepiece also includes an image directing element to direct the CGI light out of the eyepiece in an eye-ward direction. The image directing element is disposed between the first end and the second end. At least one edge running between the first end and the second end is configured to reduce reflection of the CGI light back into the eyepiece.

20 Claims, 5 Drawing Sheets

(56) References Cited

U.S. PATENT DOCUMENTS

| | | | |
|---|---|---|---|
| 6,023,372 A * | 2/2000 | Spitzer et al. | 359/630 |
| 6,043,591 A | 3/2000 | Gleckman | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |
| 6,331,916 B1 | 12/2001 | Mukawa | |
| 6,335,838 B1 | 1/2002 | Kasai et al. | |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,538,799 B2 | 3/2003 | McClelland et al. | |
| 6,618,099 B1 | 9/2003 | Spitzer | |
| 6,690,516 B2 | 2/2004 | Aritake et al. | |
| 6,693,749 B2 | 2/2004 | King et al. | |
| 6,701,038 B2 | 3/2004 | Rensing et al. | |
| 6,724,354 B1 | 4/2004 | Spitzer et al. | |
| 6,738,535 B2 | 5/2004 | Kanevsky et al. | |
| 6,747,611 B1 | 6/2004 | Budd et al. | |
| 6,771,424 B1 | 8/2004 | Amafuji et al. | |
| 6,829,095 B2 | 12/2004 | Amitai | |
| 6,879,443 B2 | 4/2005 | Spitzer et al. | |
| 6,880,931 B2 | 4/2005 | Moliton et al. | |
| 7,158,096 B1 | 1/2007 | Spitzer | |
| 7,242,527 B2 | 7/2007 | Spitzer et al. | |
| 7,391,573 B2 | 6/2008 | Amitai | |
| 7,457,040 B2 | 11/2008 | Amitai | |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,843,403 B2 | 11/2010 | Spitzer | |
| 7,900,068 B2 | 3/2011 | Weststrate et al. | |
| 8,004,765 B2 | 8/2011 | Amitai | |
| 8,767,305 B2 | 7/2014 | Spitzer et al. | |
| 2003/0090439 A1 | 5/2003 | Spitzer et al. | |
| 2005/0007672 A1 | 1/2005 | Wu | |
| 2005/0174651 A1 | 8/2005 | Spitzer et al. | |
| 2005/0219152 A1 | 10/2005 | Budd et al. | |
| 2006/0192306 A1 | 8/2006 | Giller et al. | |
| 2006/0192307 A1 | 8/2006 | Giller et al. | |
| 2007/0081256 A1 | 4/2007 | Travers | |
| 2008/0219025 A1 | 9/2008 | Spitzer et al. | |
| 2008/0241537 A1 | 10/2008 | Sennett et al. | |
| 2008/0247722 A1 | 10/2008 | Van Gorkom et al. | |
| 2009/0122414 A1 | 5/2009 | Amitai | |
| 2010/0046070 A1 | 2/2010 | Mukawa | |
| 2010/0079356 A1 | 4/2010 | Hoellwarth | |
| 2010/0103078 A1 | 4/2010 | Mukawa et al. | |
| 2010/0149073 A1 | 6/2010 | Chaum et al. | |
| 2010/0278480 A1 | 11/2010 | Vasylyev et al. | |
| 2010/0279067 A1 | 11/2010 | Sabia et al. | |
| 2011/0096100 A1 | 4/2011 | Sprague | |
| 2011/0213664 A1 | 9/2011 | Osterhout et al. | |
| 2011/0255303 A1 | 10/2011 | Nichol et al. | |
| 2013/0016292 A1 * | 1/2013 | Miao et al. | 349/11 |
| 2013/0033756 A1 | 2/2013 | Spitzer et al. | |

FOREIGN PATENT DOCUMENTS

| | | | |
|---|---|---|---|
| JP | 2007-156096 A1 | 6/2007 | |
| JP | 2010-230716 | * 10/2010 | G02B 27/02 |
| WO | WO 96/05533 A1 | 2/1996 | |
| WO | WO 2009/136393 A1 | 11/2009 | |

OTHER PUBLICATIONS

Levola, T., "Diffractive Optics for Virtual Reality Displays", Academic Dissertation, Joensuu 2005, University of Joensuu, Department of Physics, Vaisala Laboratory, 26 pages.

Mukawa, H. et al., "Distinguished Paper: A Full Color Eyewear Display using Holographic Planar Waveguides", SID Symposium Digest of Technical Papers, May 2008, vol. 39, Issue 1, pp. 89-92.

PCT/US2012/046306; PCT International Search Report and Written Opinion of the International Searching Authority, mailed Jan. 21, 2013, 8 pages.

English translation of JP 2007-156096, Machine Translation performed by Google Translate function, Mar. 28, 2013, 17 pages.

* cited by examiner

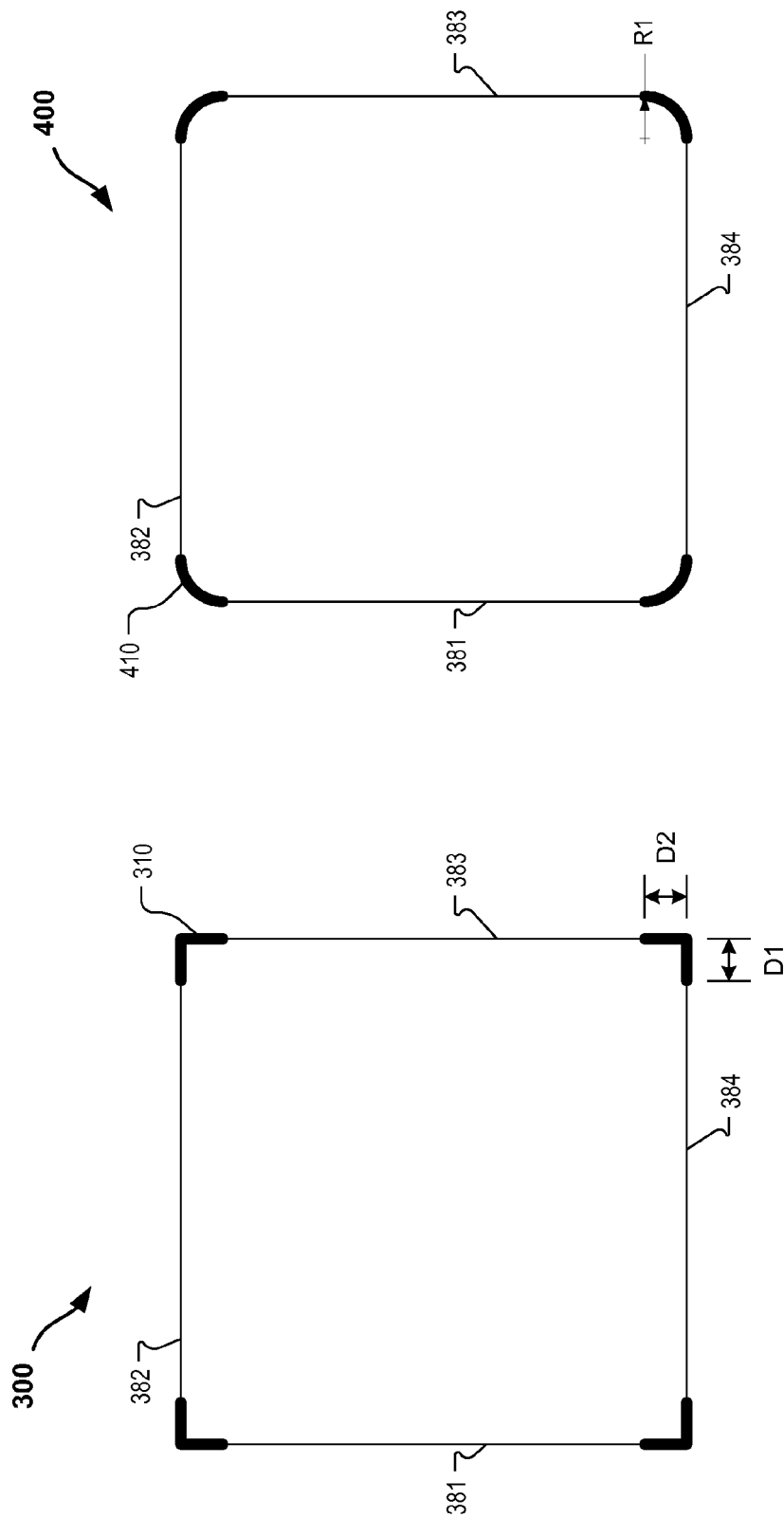

EDGE CONFIGURATIONS FOR REDUCING ARTIFACTS IN EYEPIECES

TECHNICAL FIELD

This disclosure relates generally to optics, and in particular but not exclusively, relates to eyepieces for head mounted displays.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality, the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. In the various applications of using HMDs, it is important to maintain the integrity of the CGI that is directed into the user's eye. Consequently, the optics responsible for directing the CGI light to the user's eye must be designed to deliver a quality image to the user. In some contexts, conventional optics for HMDs generate artifacts such as "streaking" in the CGI. "Streaking" may cause the user to perceive an image that includes gaps and/or redundant portions, for example. Therefore, it would be beneficial to have optics that reduce artifacts in the CGI directed to users.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 illustrates an end view of an eyepiece with reflection reducing features on edges of the eyepiece, in accordance with an embodiment of the disclosure.

FIG. 4 illustrates an end view of an eyepiece with reflection reducing features on edges of the eyepiece, in accordance with an embodiment of the disclosure.

DETAILED DESCRIPTION

Embodiments of a head mounted display ("HMD") and an apparatus for an HMD are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
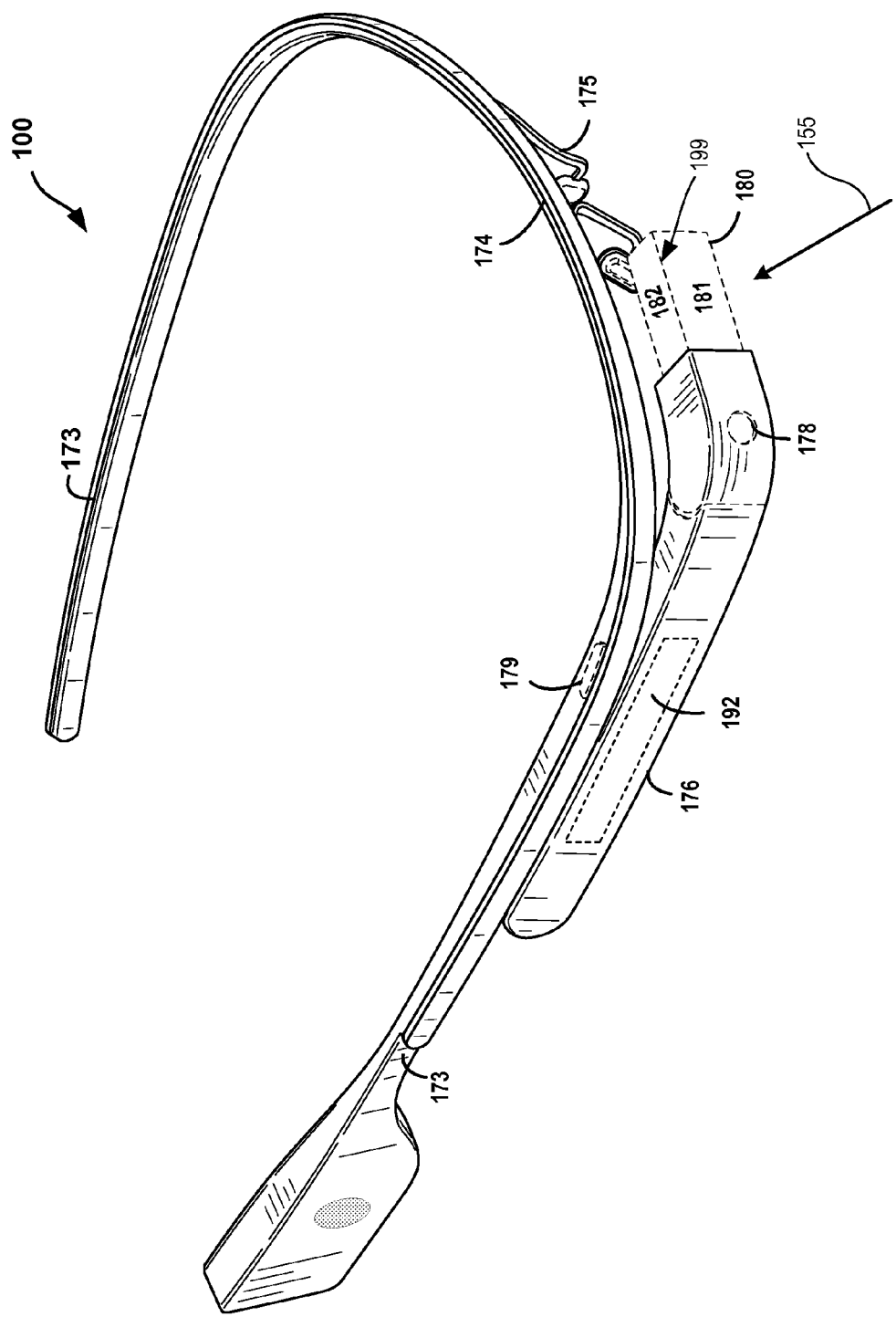
FIG. 1 illustrates a head mounted display ("HMD") including an eyepiece, in accordance with an embodiment of the disclosure.

FIG. 1 illustrates a head mounted display ("HMD") 100 including an eyepiece 180, in accordance with an embodiment of the disclosure. Example HMD 100 is a monocular HMD. HMD 100 includes side-arms 173, a center frame support 174, and a bridge portion with nosepiece 175. In the example embodiment shown in FIG. 1, center frame support 174 connects the side-arms 173. HMD 100 does not include lens-frames containing lens elements in the illustrated embodiment, but other embodiments may include lens elements. An HMD is a display device worn on or about the head. Although FIG. 1 illustrates a specific monocular HMD 100, embodiments of the present invention are applicable to a wide variety of frame types and styles (e.g. visor, headband, goggles).

The illustrated embodiment of HMD 100 is capable of displaying an augmented reality to the user. Eyepiece 180 may permit the user to see a real world image via external scene light 155 in additional to display light (having a computer generate image "CGI") generated by a display module within HMD 100. In this case, eyepiece 180 may be referred to as an "optical combiner" because it may present both external scene light 155 and CGI light to an eye of a user. As a result, the CGI light may be seen by the user as a virtual image superimposed over the real world as an augmented reality.

HMD 100 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. Component housing 176 may include light sources (not shown) for a display module that sends CGI light toward eyepiece 180 and/or optical elements (not shown) to direct light from the light sources to the eyepiece 180. As such, eyepiece 180 may include optical features that direct CGI light towards the wearer's eye when HMD 100 is being worn. In the illustrated embodiment, eyepiece 180 is roughly shaped as a three-dimensional rectangle with a top surface 182, a scene surface 181, a back eye-ward surface 183 (not visible), a bottom surface 184, (not visible), and an end surface 185 (not visible). The back eye-ward surface 183 is opposite the front scene surface 181 and the bottom surface 184 is opposite the top surface 182. Top surface 182, scene surface 181, back eye-ward surface 183, bottom surface 184, and end surface 185 make up an external surface of eyepiece 180.

Figure 2:
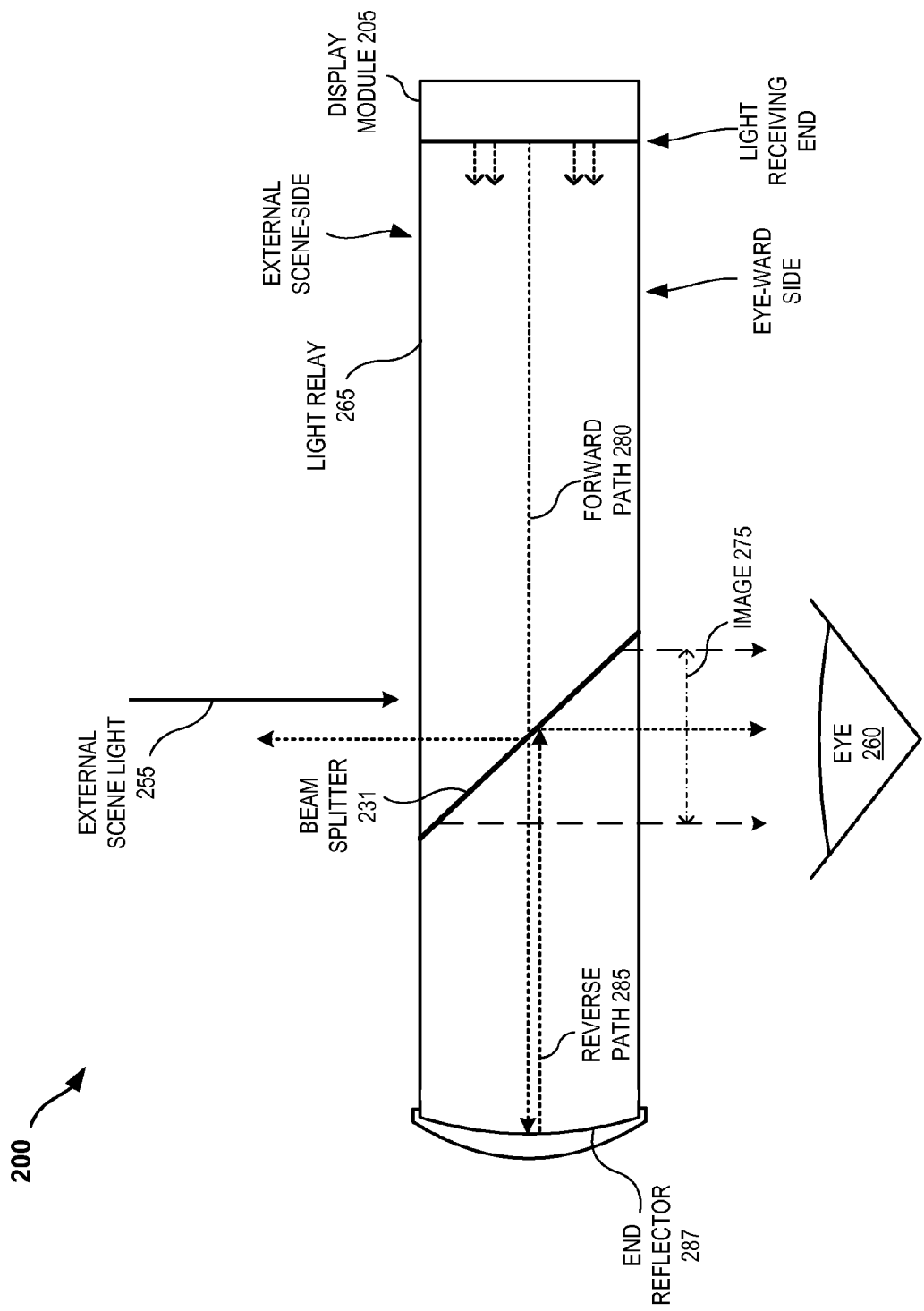
FIG. 2 illustrates a top cross-section view of an example eyepiece that directs external scene light and computer generated images ("CGI") toward an eye-ward region of the eyepiece, in accordance with an embodiment of the disclosure.

FIG. 2 illustrates a top cross-section view of an example eyepiece 200 that directs external scene light 255 and computer generated images ("CGI") toward an eye-ward region of the eyepiece, in accordance with an embodiment of the disclosure. Eyepiece 200 is an example eyepiece that could be used as eyepiece 180. It is appreciated that eyepiece 200 is only one example embodiment of an eyepiece that could be used to direct both CGI light and external scene light 255 to an eye 260 of a user.

Eyepiece 200 includes a light relay 265, a beam splitter 231, and an end reflector 287. End reflector 287 would be disposed on the end surface 185 of eyepiece 180. Display module 205 may be implemented using a light emitting diode ("LED") array, an organic LED ("OLED") array, a quantum dot array, or otherwise. Display module 205 may also be implemented by a light source (e.g. laser, LED, or bulb) backlighting an LCD display or a liquid crystal on silicon ("LCOS") panel reflecting a light source. End reflector 287 may be a concave mirror.

In operation, display module 205 launches display light (which may be CGI light) along a forward path 280 toward end reflector 287. Light relay 265 may have a transparent structure to permit the display light to pass through along forward path 280. Light relay 265 may be fabricated of a solid transparent material (e.g., glass, quartz, acrylic, clear plastic, PMMA, ZEONEX-E48R, etc.) or be implemented as a solid housing having an inner air gap through which the display light passes. Light relay 265 may operate to protect the optical path, but may not necessarily use total internal reflection ("TIR") to guide or confine the display light.

Along forward path 280, the display light encounters beam splitter 231. Beam splitter 231 reflects a first portion of the display light towards a scene surface (e.g. scene surface 181) of eyepiece 200 and passes a second portion of the display light. In one embodiment, beam splitter 231 is a 45 degree 50/50 non-polarizing beam splitter, meaning it reflects 50 percent of light and passes the other 50 percent of light. The display light passed by beam splitter 231 continues along forward path 280 and end reflector 287 reflects back the display light along a reverse path 285. The display light along reverse path 285 encounters beam splitter 231, which reflects a portion of the display light along reverse path 285 toward an eye-ward surface (e.g. eye-ward surface 183) of eyepiece 200. The illustrated embodiment of FIG. 2 allows the display light launched by display module 205 to be projected into eye 260 of a user, which is how image 275 is directed to eye 260. In addition to directing image 275 into eye 260, eyepiece 200 may also allow at least a portion of external scene light 255 to reach eye 260 (after a portion is reflected by beam splitter 231). In this case, eyepiece 200 may be referred to as an "optical combiner."

FIG. 3 illustrates an end view of an eyepiece 300 with reflection reducing features 310 on edges of the eyepiece, in accordance with an embodiment of the disclosure. The view shown in FIG. 3 could be representative of what would be seen looking into eyepiece 200 through end reflector 287. Eyepiece 300 is shown as a rectangle having a top surface 382, a scene surface 381, an eye-ward surface 383, and a bottom surface 384. Reflection reducing features 310 are disposed on edges of eyepiece 300 that run between a first end and a second end of eyepiece 300. In FIG. 1, edge 199 could be one example of an edge running between a first end and a second end of eyepiece 200. In one embodiment, the first end may be a light receiving end of the eyepiece which is coupled to receive light from display module 205 and the second end may be the end of eyepiece 300 where end reflector 287 is positioned. The edges running between the first end and the second end are configured (with reflection reducing features 310) to reduce reflection of CGI light back into the eyepiece. In FIG. 3, the edges are formed where top surface 382 joins eye-ward surface 383, where top surface 382 joins scene surface 381, where bottom surface 384 joins scene surface 381, and where bottom surface 384 joins eye-ward surface 383. Top surface 382 may be approximately orthogonal to scene surface 381 and eye-ward surface 383. Bottom surface 384 may also be approximately orthogonal to scene surface 381 and eye-ward surface 383. It is appreciated that not all edges of an eyepiece will necessarily include a reflection reducing element 310. In one embodiment, only one edge includes a reflection reducing element 310.

In certain contexts, eyepieces without reflection reducing element(s), (e.g. reflection reducing elements 310) but having surfaces and edges similar to FIG. 3 may introduce artifacts into images (e.g. image 275) presented to users. This is thought to be caused by the corners of an eyepiece facilitating total internal reflection ("TIR") for CGI light encountering the corners. When TIR is facilitated by the corners, the CGI light may reflect back into an eyepiece and then (after being reflected within the eyepiece) be directed in an eye-ward direction into the eye of a wearer of an HMD. However, this recycled CGI light that has been reflected back into the eyepiece may not be presented to the user's eyes in the correct position after being reflected within the eyepiece, which may introduce artifacts to images seen by users. Therefore, having a reflection reducing element on the edges (corners) of an eyepiece can reduce unwanted reflections of the CGI light and thus reduce artifacts in images that are presented to wearers of an HMD.

Figure 6:
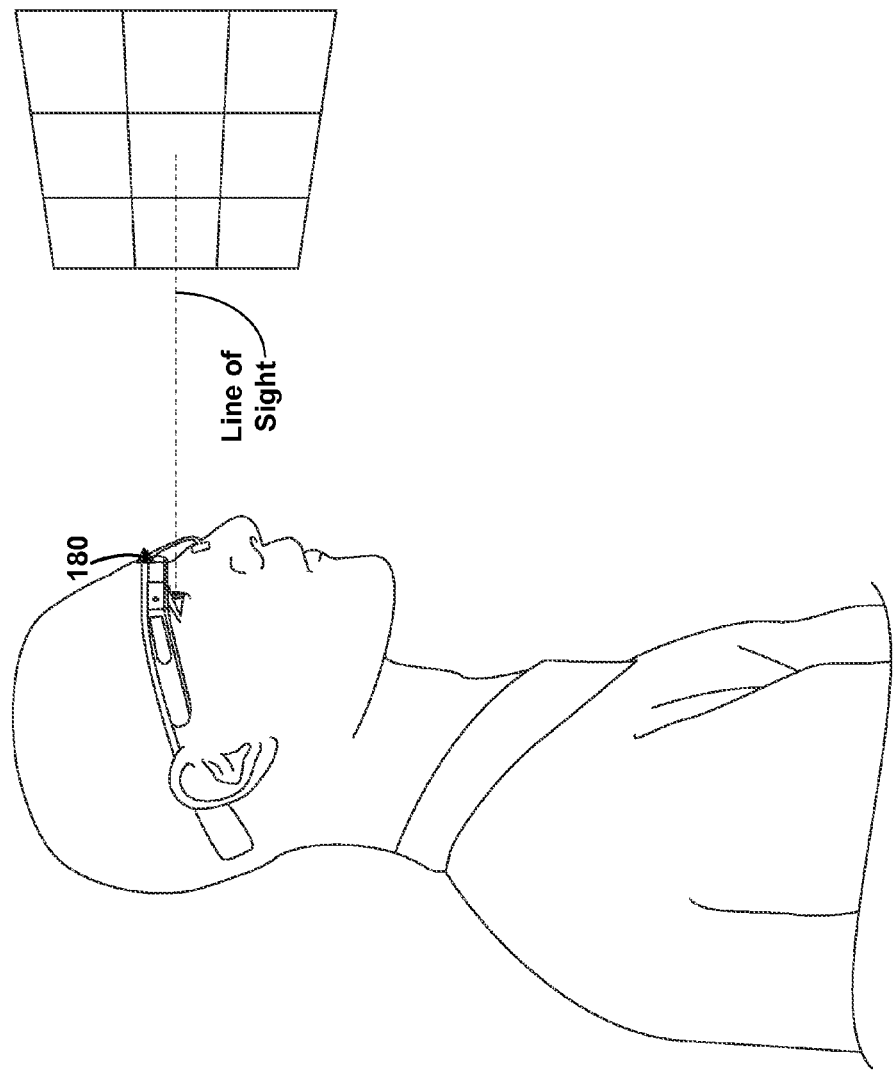
FIG. 6 shows an HMD having an eyepiece that is positioned above a user's eye, in accordance with an embodiment of the disclosure.

Some HMDs have the eyepiece positioned above the user's eye and out of a user's usual line of sight (as shown in FIG. 6). In these HMDs, a CGI light directing element (e.g. beam splitter 231) may be tilted downward to direct the CGI light down toward the user's eye 260. In this case, the edge formed by the intersection of a bottom surface and an eye-ward surface of the eyepiece may especially benefit from a reflection reducing feature, as the CGI light may be more likely to encounter the edge that joins an eye-ward surface and a bottom surface.

In FIG. 3, reflection reducing elements 310 are disposed along the edge on the intersecting surfaces that form a given edge. In one example, the dimensions D1 and D2 of the reflection reducing element 310 are each 100 µm. In one embodiment, the reflection reducing elements 310 may include darkening elements to absorb CGI light. The darkening elements may include paint, ink, and/or tape. The paint, ink, and/or tape may be black. In one embodiment, the reflection reducing elements 310 may be a texturing of the eyepiece surfaces to create a diffuse surface that reduces TIR. The texturing of the eyepiece to create a diffuse surface may be a texturing that is impressed 5 µm into a given surface of the eyepiece.

FIG. 4 illustrates an end view of an eyepiece 400 with reflection reducing features 410 on edges of the eyepiece, in accordance with an embodiment of the disclosure. The view shown in FIG. 4 could be representative of what would be seen looking into eyepiece 200 through end reflector 287. Eyepiece 400 is shown as a rectangle having a top surface 382, a scene surface 381, an eye-ward surface 383, and a bottom surface 384. Reflection reducing features 410 are disposed on edges (e.g. edge 199) of eyepiece 400 that run between a first end and a second end of eyepiece 400. In one embodiment, the first end may be a light receiving end of the eyepiece which is coupled to receive light from display module 205 and the second end may be the end of eyepiece 400 where end reflector 287 is positioned. The edges running between the first end and the second end are configured (with reflection reducing features 410) to reduce reflection of CGI light back into the eyepiece. It is appreciated that not all edges of an eyepiece will necessarily include a reflection reducing element 410. In one embodiment, only one edge includes a reflection reducing element 410.

In FIG. 4, the edges of eyepiece 400 are beveled (and more specifically filleted) to reduce reflection of CGI light back into eyepiece 400. For the purposes of this disclosure, the term "beveled" shall include the terms "chamfer" and the term "fillet." In other words, if an edge is described as "beveled," it may be chamfered or filleted. In FIG. 4, the filleted edges create a rounded edge that may have a radius R1 of 200 µm. The rounded edges may be ground or textured to create a diffuse surface that reduces TIR. The texturing to create a diffuse surface may be a texturing that is impressed 5 µm into the rounded corners. In one embodiment, darkening elements may be disposed on the rounded corners to absorb CGI light. The darkening elements may include paint, ink, and/or tape. The paint, ink, and/or tape may be black.

Figure 5:
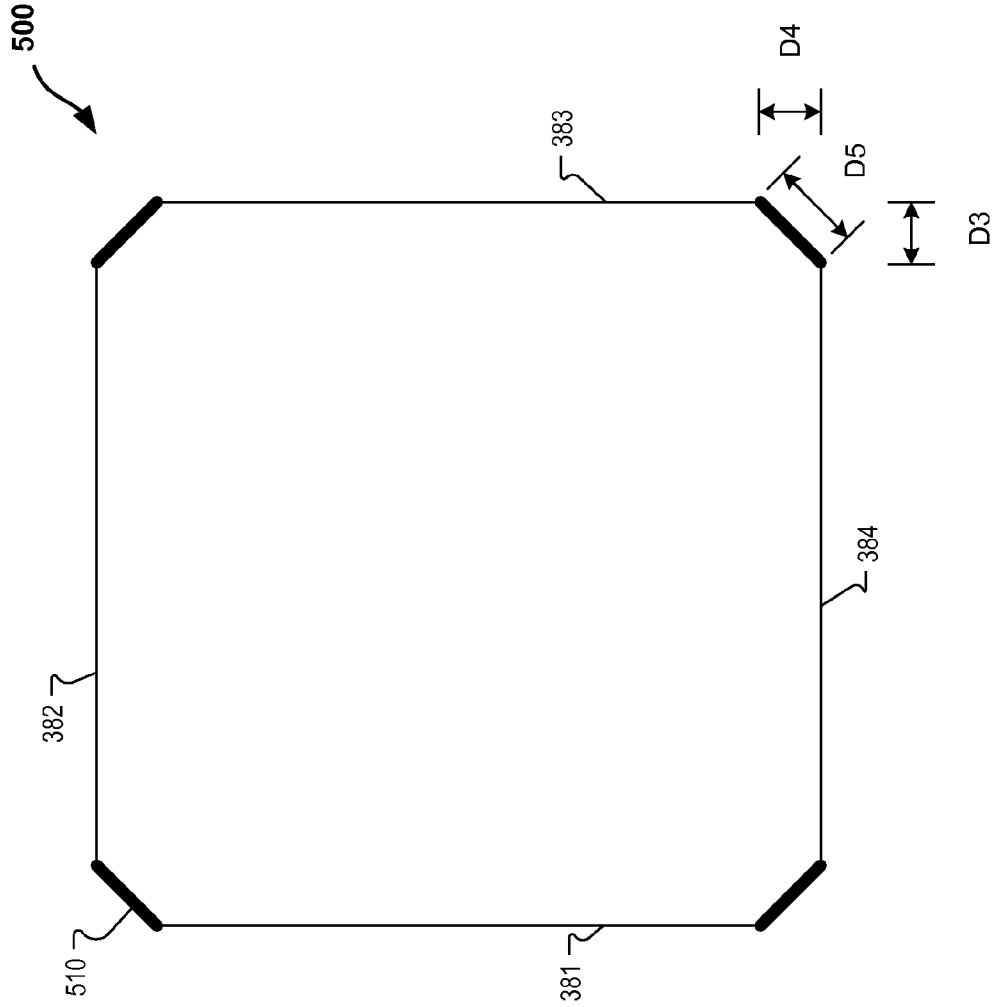
FIG. 5 illustrates an end view of an eyepiece with reflection reducing features on edges of the eyepiece, in accordance with an embodiment of the disclosure.

FIG. 5 illustrates an end view of an eyepiece 500 with reflection reducing features 510 on edges of the eyepiece, in accordance with an embodiment of the disclosure. The view shown in FIG. 5 could be representative of what would be seen looking into eyepiece 200 through end reflector 287. Eyepiece 500 is shown as a rectangle having a top surface 382, a scene surface 381, an eye-ward surface 383, and a bottom surface 384. Reflection reducing features 510 are disposed on edges (e.g. edge 199) of eyepiece 500 that run between a first end and a second end of eyepiece 500. In one embodiment, the first end may be a light receiving end of the eyepiece which is coupled to receive light from display module 205 and the second end may be the end of eyepiece 500 where end reflector 287 is positioned. The edges running between the first end and the second end are configured (with reflection reducing features 510) to reduce reflection of CGI light back into the eyepiece. It is appreciated that not all edges of an eyepiece will necessarily include a reflection reducing element 510. In one embodiment, only one edge includes a reflection reducing element 510.

In FIG. 5, the edges of eyepiece 500 are beveled (and more specifically chamfered) to reduce reflection of CGI light back into eyepiece 500. In FIG. 5, the chamfered edges create a chamfered surface with a dimension D5. In one example dimensions D3 and D4 are each approximately 300 µm and dimension D5 is approximately 424 µm. The chamfered surface may create an angle relative to an image directing element (e.g. beam splitter 231) that gives CGI light an angle of incidence that allows it to exit eyepiece 500 (rather than being reflected back into the eyepiece) when it encounters the chamfered surface. In one embodiment, the chamfered surface may be polished and transparent. In one embodiment, the chamfered surface may be ground or textured to create a diffuse surface. The texturing to create a diffuse surface may be a texturing that is impressed 5 µm into the chamfered surface. In one embodiment, darkening elements may be disposed on the chamfered corners to absorb CGI light. The darkening elements may include paint, ink, and/or tape. The paint, ink, and/or tape may be black.

Although terms like "bevel," "chamfer," and "fillet" are typically associated with a negative process (where material is removed to create the feature), it is understood that the beveled edges (rounded or chamfered) may be formed without removing material. In one example, the eyepieces are molded and the bevel features can be included in the mold, and thus no material is actually removed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display ("HMD") comprising:
   a light receiving end for receiving computer generated image ("CGI") light propagating along a forward optical path;
   an end reflector disposed at an opposite end of the eyepiece from the light receiving end to reflect the CGI light along a reverse optical path within the eyepiece;
   a beam splitter positioned to direct the CGI light propagating along the reverse optical path in an eye-ward direction, wherein the beam splitter is disposed between the light receiving end and the end reflector; and
   at least one edge of the eyepiece running between the light receiving end and the end reflector, wherein the at least one edge is beveled to reduce reflection of the CGI light back into the eyepiece, wherein the at least one edge runs along a direction extending from the light receiving end to the end reflector.

2. The eyepiece of claim 1, wherein the at least one edge is a chamfered edge to reduce said reflection of the CGI light.

3. The eyepiece of claim 1, wherein the at least one edge is a filleted edge to reduce said reflection of the CGI light.

4. The eyepiece of claim 1, wherein a beveled portion of the at least one edge is textured to form a diffuse surface.

5. The eyepiece of claim 1, wherein a beveled portion of the at least one edge is darkened to absorb the CGI light.

6. The eyepiece of claim 1, wherein the at least one edge includes a first edge that joins a bottom surface of the eyepiece with an eye-ward surface of the eyepiece.

7. The eyepiece of claim 6, wherein the bottom surface and the eye-ward surface are approximately orthogonal.

8. The eyepiece of claim 1, wherein the at least one edge includes:
   a first edge that joins a bottom surface of the eyepiece with an eye-ward surface of the eyepiece;
   a second edge that joins the bottom surface with a scene surface of the eyepiece that is disposed opposite the eye-ward surface;
   a third edge that joins a top surface with the scene surface, the top surface opposite the bottom surface; and
   a fourth edge that joins the top surface and the eye-ward surface.

9. A head mounted display ("HMD") comprising:
   a display module for launching computer generated image ("CGI") light along a forward propagating path; and
   an eyepiece including:
      a first end optically coupled to receive the CGI light from the display module;

a second end disposed opposite the display module and the first end;

an image directing element to direct the CGI light in an eye-ward direction, wherein the image directing element is disposed between the first end and the second end; and at least one edge running between the first end and the second end, wherein the at least one edge is beveled to reduce reflection of the CGI light back into the eyepiece, wherein the at least one edge runs along a direction extending from the first end to the second end.

10. The HMD of claim 9, wherein the at least one edge is a chamfered edge to reduce said reflection of the CGI light.

11. The HMD of claim 9, wherein the at least one edge is a filleted edge to reduce said reflection of the CGI light.

12. The HMD of claim 9, wherein a beveled portion of the at least one edge is textured to form a diffuse surface.

13. The HMD of claim 9, wherein a beveled portion of the at least one edge is darkened to absorb the CGI light.

14. The HMD of claim 9, wherein the at least one edge includes a first edge that joins a bottom surface of the eyepiece with an eye-ward surface of the eyepiece.

15. The HMD of claim 14, wherein the bottom surface and the eye-ward surface are approximately orthogonal.

16. An optical apparatus comprising:
a first end for receiving computer generated image ("CGI") light;
a second end disposed opposite the first end;
an image directing element to direct the CGI light out of the optical apparatus in an eye-ward direction, wherein the image directing element is disposed between the first end and the second end; and
at least one edge running between the first end and the second end, wherein the at least one edge is beveled to reduce reflection of the CGI light back into the optical apparatus, wherein the at least one edge runs along a direction extending from the first end to the second end.

17. The optical apparatus of claim 16, wherein the at least one edge is a chamfered edge to reduce said reflection of the CGI light.

18. The optical apparatus of claim 16, wherein the at least one edge is a filleted edge to reduce said reflection of the CGI light.

19. The optical apparatus of claim 16, wherein intersecting surfaces that form the at least one edge include textured portions to create a diffuse surface along the at least one edge.

20. The optical apparatus of claim 16, wherein the at least one edge has darkening elements disposed along the edge on intersecting surfaces that form the edge, the darkening elements to absorb the CGI light.

* * * * *